United States Patent
Smith, Jr. et al.

(10) Patent No.: US 12,228,674 B1
(45) Date of Patent: Feb. 18, 2025

(54) RADAR MOUNT SYSTEM

(71) Applicants: Henry Maclin Smith, Jr., Fairhope, AL (US); Richard Frank Gant, Fairhope, AL (US)

(72) Inventors: Henry Maclin Smith, Jr., Fairhope, AL (US); Richard Frank Gant, Fairhope, AL (US)

( * ) Notice: Subject to any disclaimer, the term of this patent is extended or adjusted under 35 U.S.C. 154(b) by 353 days.

(21) Appl. No.: 17/728,587

(22) Filed: Apr. 25, 2022

(51) Int. Cl.
*G01S 7/02* (2006.01)
*G01S 13/937* (2020.01)

(52) U.S. Cl.
CPC ............ *G01S 7/027* (2021.05); *G01S 13/937* (2020.01)

(58) Field of Classification Search
CPC ....... G01S 7/027; G01S 13/937; A61B 5/303; F24S 25/70; F16M 11/18
See application file for complete search history.

(56) References Cited

U.S. PATENT DOCUMENTS

| | | |
|---|---|---|
| 3,304,037 A | 2/1967 | Candela |
| 3,450,378 A | 6/1969 | Cucka |
| 3,822,049 A | 7/1974 | Sanders |
| 4,659,044 A * | 4/1987 | Armstrong ............. F16M 11/22 114/90 |
| 5,417,178 A | 5/1995 | Harrelson |
| 6,620,105 B2 * | 9/2003 | Sharpe ................... A61B 5/303 385/139 |
| 6,928,948 B1 | 8/2005 | Shannon |
| 7,033,209 B2 | 4/2006 | Swiatek et al. |
| 11,091,232 B1 | 8/2021 | Montague et al. |
| 2014/0175244 A1 * | 6/2014 | West ....................... F24S 25/70 52/555 |
| 2016/0025264 A1 * | 1/2016 | Casagrande ........... F16M 13/00 248/205.9 |
| 2016/0268669 A1 * | 9/2016 | Wilcox .................. F16M 11/18 |
| 2018/0122351 A1 | 5/2018 | Simonton |

(Continued)

OTHER PUBLICATIONS

Si-TEX, "T-760 Series, Marine Radar Equipment Instruction Manual," Code No. 7ZPRD0909 Jul. 2014 creation The 3rd edition SI-TEX (Year: 2014).*

(Continued)

*Primary Examiner* — Bernarr E Gregory
*Assistant Examiner* — Samarina Makhdoom
(74) *Attorney, Agent, or Firm* — C. Brandon Browning; Maynard Nexsen PC

(57) ABSTRACT

The present disclosure is directed to a radar mount system and methods of using same. The system includes a base plug for attachment to a watercraft, where the attachment includes the formation of a waterproof seal between the base plug and the watercraft. The system further includes an exterior plate that receives the base plug and serves as an attachment location for a radar system. When the base plug is received within the exterior plate, a locking system is configured to hold the exterior plate, with its attached radar system, in position on the mounted base plug. When a user removes locking nuts of the locking system, the locking system is configured to be removed from the base plug and the exterior plate, allowing the exterior plate with attached radar system to be removed from the watercraft without damaging the waterproof seal between the base plug and the watercraft.

20 Claims, 7 Drawing Sheets

(56) References Cited

U.S. PATENT DOCUMENTS

2019/0001567 A1    1/2019   Chaffins et al.

OTHER PUBLICATIONS

Furuno, "Installation Manual Marine Radar Model FAR-2218(-BB)/2228(-BB)/2318/2328/FAR-2238S(-BB/-NXT/-NXT-BB)/FAR-2338S(-NXT)/2328W/2338SW/ FAR-2258(-BB)/2358" Furuno Electric Co., LTD Jun. 2019 (Year: 2019).*
Sea Value, "2016 Boating Accessories," Sea Value, Land 'N' Sea Distributing, Inc., 3131 N. Andrews Ave. Ext., Pompano Beach, FL 33064 (Year: 2016).*
"Custom Fabricated Marine Radar Mounts," Nautical Creations, LLC, 2022, pp. 1-5.
"Deck Connector Plug&SCKT 2 Pole C/P Zinc," Hamilton Marine, 2022, pp. 1-3.

* cited by examiner

RADAR MOUNT SYSTEM

TECHNICAL FIELD

The present invention is directed to a radar mount system for removal and reattachment of a watercraft radar system.

BACKGROUND OF INVENTION

Watercrafts use radar systems to provide data related to obstacles or objects within the range of the radar system. These systems assist watercraft operations by preventing collisions and identifying objects, especially when such objects are not easily discernable to the human eye, such as at great distances, in low light conditions, or in adverse weather conditions.

Radar systems, such as open array radar systems, are typically mounted on a top surface of a watercraft. As many watercraft are large, the added height of a radar system can make watercraft transportation on roadways unsafe. For example, the added height of a radar system may result in damage to power lines or other overhead objects during overland transportation.

To reduce transport safety issues, radar systems may be temporarily removed. However, this removal requires unfastening the radar system from the watercraft hardtop and breaks the waterproof seal around the mounting region. Thus, typical methods of radar system removal are time consuming and require resealing of the waterproof seal upon reinstallation of the radar system. Improved methods of radar system mounting are needed to avoid such effort and expense.

SUMMARY OF THE INVENTION

The present invention is directed to a radar mount system, kit, and methods of using same. In one aspect of the invention, there is provided a radar mount system including a base plug for attachment to a surface of a watercraft, the base plug having at least one base fastener hole, each base fastener hole configured to accommodate one base fastener for attaching the base plug to the watercraft. The system further includes an exterior plate having at least one radar fastener hole and a center cutout, each radar fastener hole configured to accommodate one radar fastener for attaching a radar system to the exterior plate, and the center cutout configured to receive the base plug for connecting the exterior plate to the base plug. A locking system is further included, the locking system having at least one horizontal rod, a bracket, and at least one locking nut, each horizontal rod configured to be inserted through at a set of aligned rod holes in each of the base plug and the exterior plate, each horizontal rod threaded on a first end to receive one locking nut, and each horizontal rod configured to connect to the bracket at a second end. When the base plug is mounted on the watercraft and the exterior plate is positioned with the base plug in its center cutout, the at least one horizontal rod is configured to be inserted through the set of aligned rod holes with the bracket one the second end and the at least one locking nut on the first end, securing the exterior plate with the attached radar system about the base plug on the watercraft. When each locking nut is removed from each horizontal rod, the locking system is configured to be removed from the base plug and exterior plate, allowing the exterior plate with the attached radar system to be removed from the base plug without removing the base plug from the watercraft.

In some instances, the at least one locking nut is removable using a security tool that is uniquely compatible with a shape of the at least one locking nut. In some instances, the base plug is configured to be sealed to the watercraft using a waterproof sealant. In some cases, a waterproof seal between the base plug and the watercraft is maintained when the exterior plate with the attached radar system is removed from the base plug. In some instances, the base plug includes a recessed plate for providing support for the radar system. In some cases, the recessed plate is composed of stainless steel or powder coated aluminum. In some instances, the exterior plate and the base plate are composed of marine-grade high-density polyethylene (HDPE) material. In some instances, the set of aligned rod holes are positioned on parallel sides of each of the base plug and the exterior plate.

In another aspect of the invention, there is provided a radar mount kit having a base plug for attachment to a surface of a watercraft. The base plug has at least one base fastener hole and at least one base fastener configured to be received within one base fastener hole for attaching the base plug to the watercraft. The kit includes an exterior plate having at least one radar fastener hole and a center cutout, the center cutout configured to receive the base plug for connecting the exterior plate to the base plug. At least one radar fastener is included in the kit and configured to be received within one radar fastener hole for attaching a radar system to the exterior plate. The kit further includes a locking system having at least one horizontal rod, a bracket, and at least one locking nut, each horizontal rod configured to be inserted through at a set of aligned rod holes in each of the base plug and the exterior plate, each horizontal rod threaded on a first end to receive one locking nut, and each horizontal rod configured to connect to the bracket at a second end. When the base plug is mounted on the watercraft and the exterior plate is positioned with the base plug in its center cutout, the at least one horizontal rod is configured to be inserted through the set of aligned rod holes with the bracket one the second end and the at least one locking nut on the first end, securing the exterior plate with the attached radar system about the base plug on the watercraft. When each locking nut is removed from each horizontal rod, the locking system is configured to be removed from the base plug and exterior plate, allowing the exterior plate with the attached radar system to be removed from the base plug without removing the base plug from the watercraft.

In some instances, the kit further comprises a security tool that is uniquely compatible with a shape of the at least one locking nut for attaching and removing the at least one locking nut from the at least one horizontal rod. In some instances, the kit further comprises a waterproof sealant for creating a waterproof seal between the base plug and the watercraft. In some instances, the base plug includes a recessed plate for providing support for the radar system. In some cases, the recessed plate is composed of stainless steel or powder coated aluminum. In some instances, the exterior plate and the base plate are composed of marine-grade high-density polyethylene (HDPE) material. In some instances, the kit further comprises a thread locking adhesive for securing the at least one radar fastener within the at least one radar fastener hole. In some instances, the at least one radar fastener hole is positioned about the exterior plate in a pattern that is compatible with attachment of the radar system.

In yet another aspect of the invention, there is provided a method of removing a mounted radar system from a watercraft without compromising a waterproof seal between a radar mount system and the watercraft. The method includes first providing a watercraft with a radar mount system for radar system attachment. The radar mount system includes a base plug attached to a surface of the watercraft, the base plug having at least one base fastener hole, each base fastener hole accommodating one base fastener to attach the base plug to the watercraft. The radar mount system further includes an exterior plate having at least one radar fastener hole and a center cutout, each radar fastener hole accommodating one radar fastener to attach the radar system to the exterior plate, and the center cutout receiving the base plug to connect the exterior plate to the base plug. The radar mount system has a locking system with at least one horizontal rod, a bracket, and at least one locking nut, each horizontal rod inserted through at a set of aligned rod holes in each of the base plug and the exterior plate, each horizontal rod threaded on a first end and receiving one locking nut, and each horizontal rod connected to the bracket at a second end, such that the exterior plate with the attached radar system is secured about the base plug on the watercraft. For removing the radar system, each of the at least one locking nuts is removed from each of the at least one horizontal rods, and the locking system is then removed from the base plug and exterior plate. The exterior plate with the attached radar system is the removed from the base plug without removing the base plug from the watercraft so that a waterproof seal between the base plug and the watercraft is maintained.

In some instances, each of the at least one locking nuts are removed using a security tool that is uniquely compatible with a shape of the at least one locking nut. In some instances, the base plug includes a stainless steel recessed plate for providing support for the radar system. In some instances, the exterior plate and the base plate are composed of marine-grade high-density polyethylene (HDPE) material.

A further understanding of the nature and advantages of the present invention will be realized by reference to the remaining portions of the specification and the drawings.

BRIEF DESCRIPTION OF DRAWINGS

The present disclosure same can be better understood, by way of example only, with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION OF THE INVENTION

The present invention is generally directed to a radar mount system for removably attaching a radar system to a surface of a watercraft. A prior art radar attachment system is depicted in FIG. 1, while the present radar mount system is disclosed in FIGS. 2 through 9.

Figure 1:
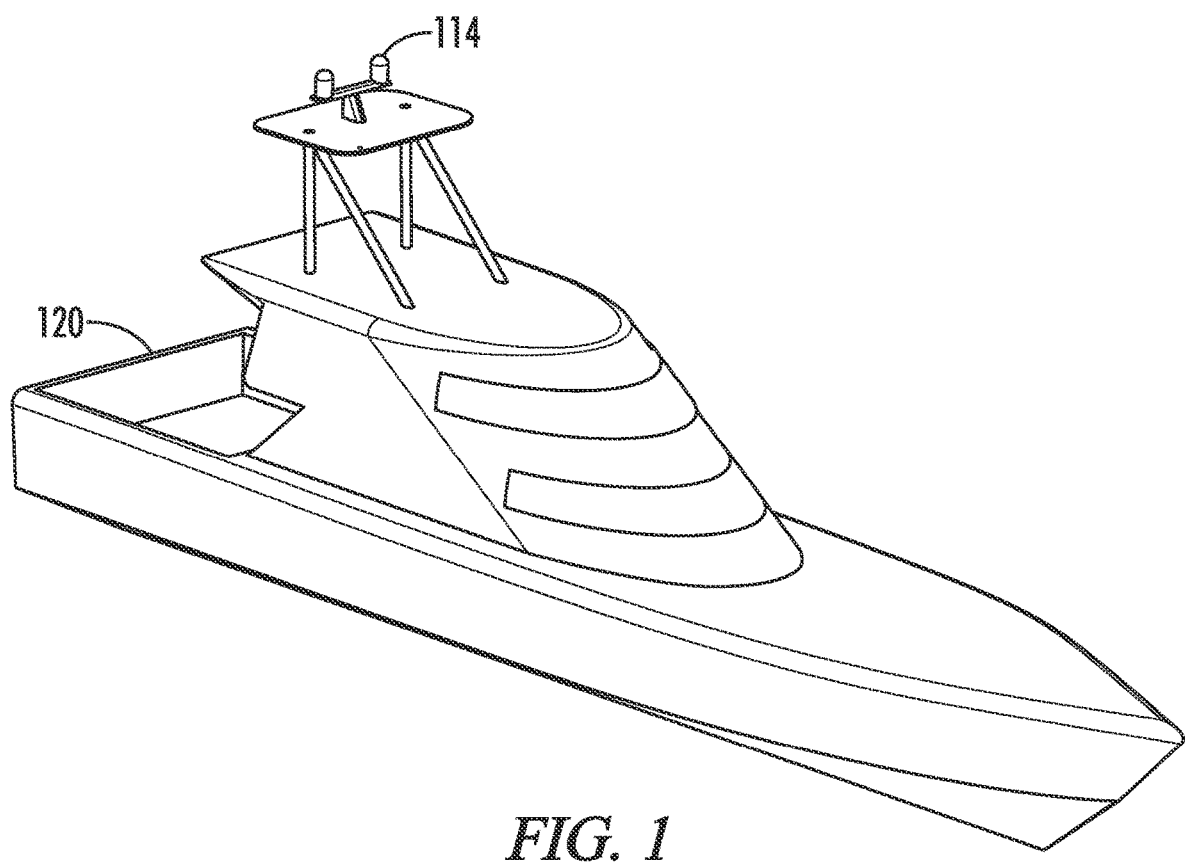
FIG. 1 is a prior art mounted radar system on a watercraft hardtop during watercraft operation.

A prior art radar attachment system is depicted in FIG. 1, where the radar system 114 is attached to a surface of a watercraft 120. Typically, radar system 114 is an open array radar system or a dome-shaped radome. Open array radar systems have wide antennas that can rotate and are capable of detecting small objects at large distances. Radomes use a dome structure to at least partially cover moving components, and are generally smaller than open array radars. However, they provide lower resolution than open array radars and may not be appropriate for applications where sharp resolution of adjacent objects is required. In the present disclosure, radar system 114 is any mountable radar system, but in some preferred embodiments radar system 114 is an open array radar system.

Watercraft 120 includes any vehicle that is capable of being operated in water. Watercraft 120 may have a propulsion capability for movement (e.g. engine-powered, solar-powered, wind-powered), while in other cases watercraft 120 is unpowered or man-powered. Examples of watercraft include, but are not limited to, boats (e.g. fishing boats, dinghies, deck boats, center console boats, game boats, motor yachts, bowriders, catamarans, houseboats, trawlers, pontoons, and cabin cruiser boats), ships, and personal watercraft (e.g. jet skis). Watercraft 120 is compatible with radar attachment to a surface, which is typically an external top surface, such as a hardtop.

Figure 2:
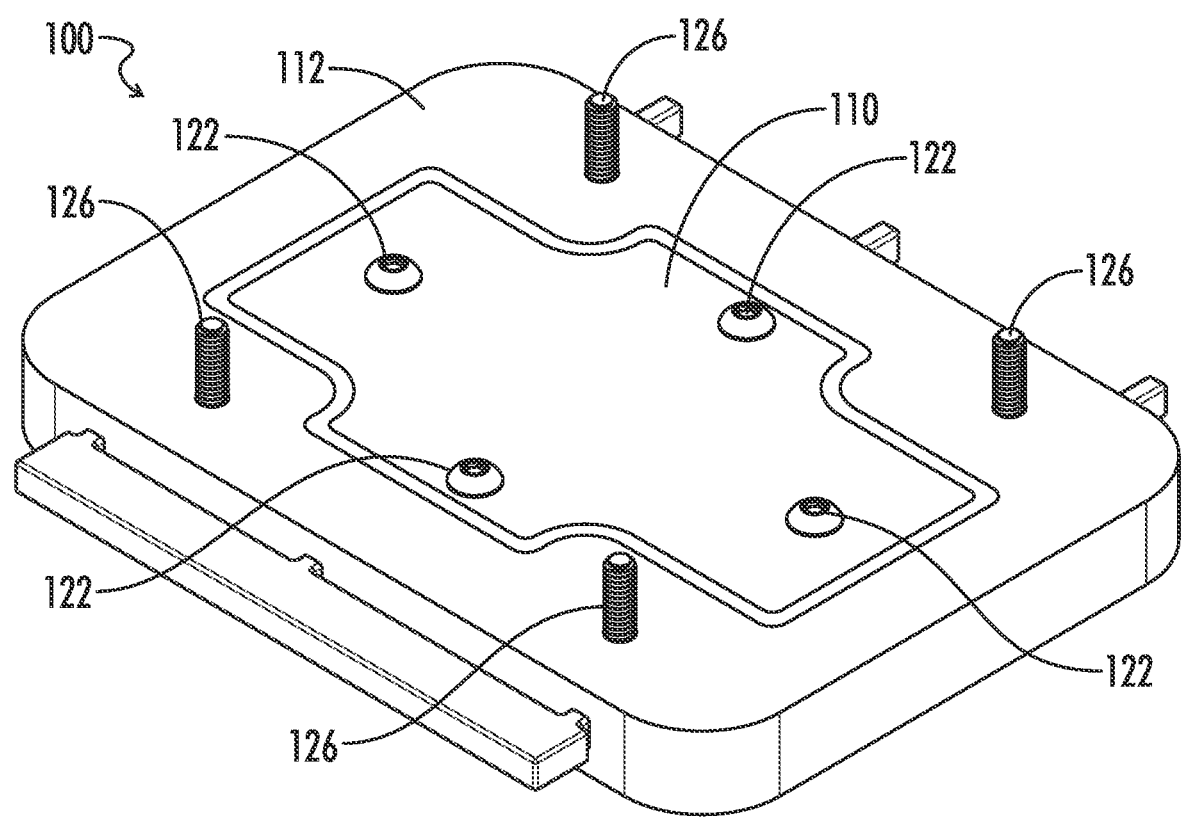
FIG. 2 is the radar mount system of the present disclosure with a base plug for mounting to a watercraft and a removable exterior plate for attachment and removal of a radar system.

Referring to FIG. 2, a radar mount system 100 of the present disclosure is presented. Radar mount system 100 improves upon typical radar attachment means by allowing radar system removal and reattachment without impacting the waterproof sealing between the mount and the hardtop of watercraft 120. While prior art systems require the waterproof seal to be broken for radar detachment, the present system 100 avoids this issue by use of a base plug 110 that remains sealed to the top of watercraft 120 and an exterior plate 112 for attachment to radar system 114. Exterior plate 112 is removable from base plug 110, as is described in detail below. The ability to remove exterior plate 112 from base plug 110 for detachment and reattachment of radar system 114 allows for the waterproof seal of base plug 110 to remain intact. Thus, the present radar mount system 100 saves time in radar system removal and reattachment, as well as ensures the integrity of the waterproof seal throughout the process. Radar system 114 is removable for safe transport of watercraft 120 and the waterproof seal is maintained to prevent water from entering the hardtop of watercraft 120.

Base plug 110 is utilized for attachment of radar mount system 100 to a surface of watercraft 120. In some embodiments, this surface is a top surface of watercraft 120, such as a hardtop. To prevent water from entering the hardtop, a waterproof seal is placed about base plug 110. Thus, after base plug 110 is fastened to hardtop, a waterproof seal, such as a silicone sealant, is applied. However, other sealants are compatible with the present disclosure such that they prevent water from entering the hardtop from radar mount system 100.

Figure 3:
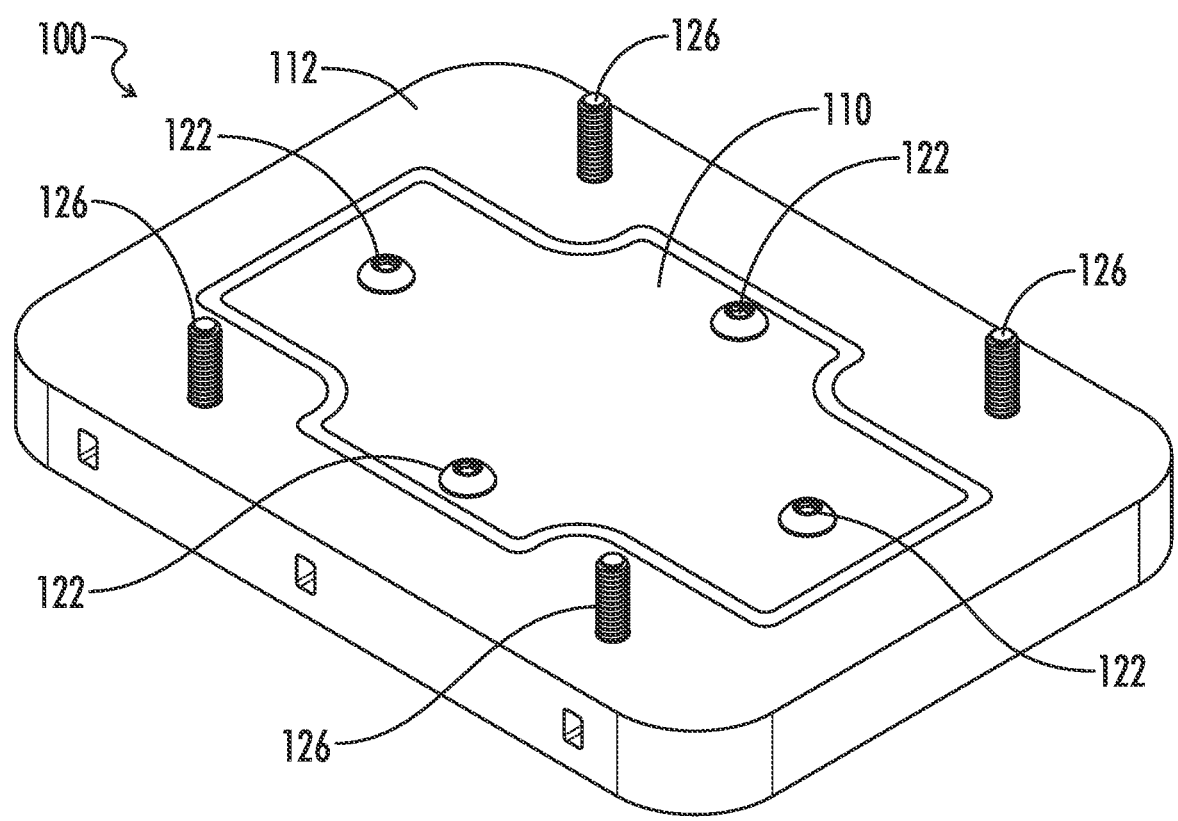
FIG. 3 is the radar mount system of FIG. 2 with radar mount fasteners for attachment of the radar system.

Referring now to FIG. 3, radar mount system 100 is shown in a perspective view as having a depth. The depth is such that base plug 110 is configured to be securely sealed on the hardtop of watercraft 120 and that exterior plate 112 is configured to securely support the mounting of radar system 114. The depth is also provided such that base plug 110 and exterior plate 112 may be removably coupled, as is described in greater detail below. Other dimensions of radar mount system 100, such as length and width, vary according to application and compatibility with the mounting bolt pattern of radar system 114. Radar mount system 100 is formed from 1.5 inch thick King StarBoard® or another marine-grade high-density polyethylene (HDPE) material, with the exception of fasteners, the locking rod system, and a recessed plate 118. Base plug 110 is fastened to the top surface of watercraft 120 using a plurality of base fasteners 122. Similarly, radar system 114 is attached to exterior plate 112 using a plurality of radar fasteners 126.

Figure 4:
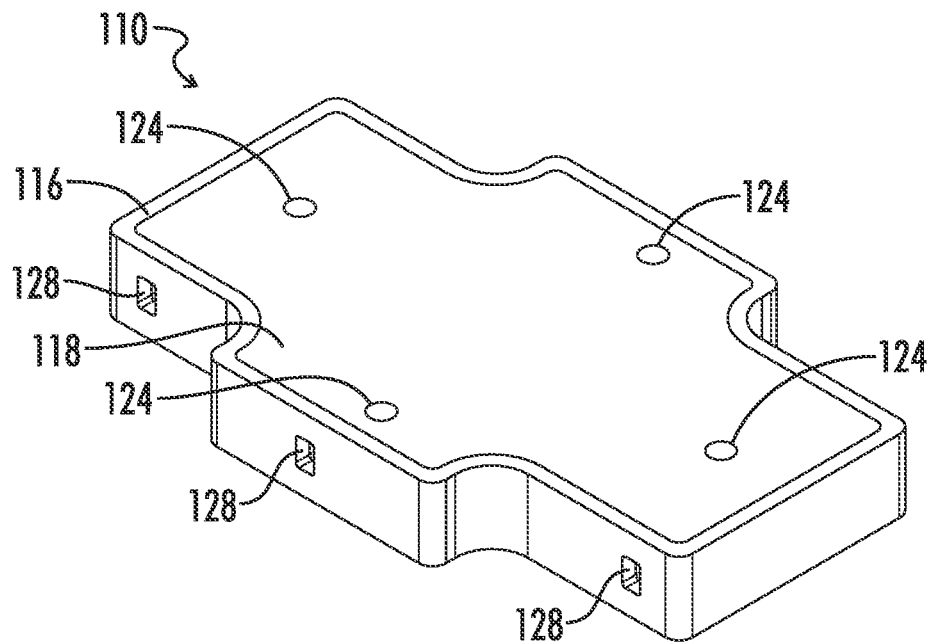
FIG. 4 is the base plug of the radar mount system of FIG. 2, where holes are provided for fastening to the watercraft.

In FIG. 4, base plug 110 is shown separated from exterior plate 112. Base plug 110 is shaped as a rounded, three dimensional cross, though other shapes are possible such that base plug 110 is mountable on the top of watercraft 120 and such that base plug 110 fits within exterior plate 112. A plurality of base fastener holes 124 are positioned through base plug 110, each for receiving a base fastener 122. In the depicted embodiment, four base fastener holes 124 are shown, though other numbers of base fastener holes are compatible with the present disclosure such that base plug 110 is configured to be securely fastened to the top of watercraft 120. The positioning of base fastener holes 124 is such that plug base 110 is configured to be securely fastened with distributed fastener pressure. Additionally, positions avoid the intersection of base fasteners 122 with the path of horizontal rods 130, which are described below. Base fastener hole positions vary in embodiments not depicted. The dimensions of base fastener holes 124 are such that they are configured to accommodate base fasteners 122, which include bolts, screws, or other fastening means known in the art. Base fasteners 122 are commercially available, and are in some instances included in a kit for the assembly of radar mount system 100. Base plug 110 is mounted to the top of watercraft 120 prior to sealing with a waterproof sealant. The location of base plug attachment is such that a mounted, commercially available radar system 114 is capable of performing its intended operations.

Figure 5:
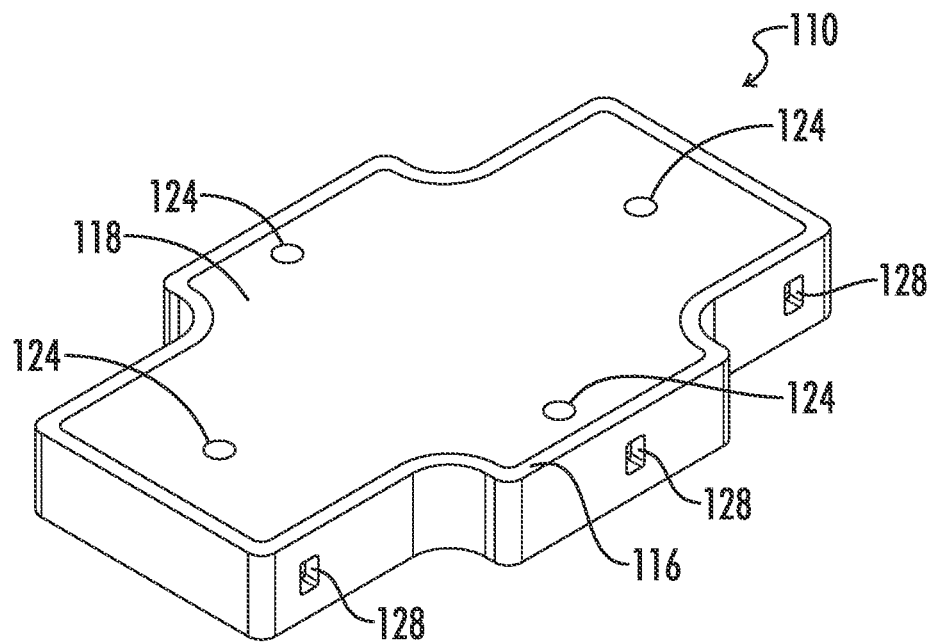
FIG. 5 is a perspective view of the base plug of FIG. 4, with horizontal rod holes provided for securing the exterior plate to the base plug.

Base plug 110 further includes a plurality of rod holes 128, each for the passage of one horizontal rod 130. In the depicted embodiment, three rod holes 128 are present, though other numbers of rod holes 128 are compatible with the present disclosure such that horizontal rods 130 are configured to removably secure exterior plate 112 about base plug 110. In FIG. 5, base plug 110 is shown in a perspective view with a top rod hole 128 visible. Rod holes 128 extend horizontally through plug base 110 at approximately a center depth. Rod holes 128 on base plug 110 are configured to align with rod holes 128 on exterior plate 112, such that base plug 110 may be secured within exterior plate 112 by horizontal rods 130. The diameter of rod holes 128 varies according to the diameter of horizontal rods 130.

Figure 6:
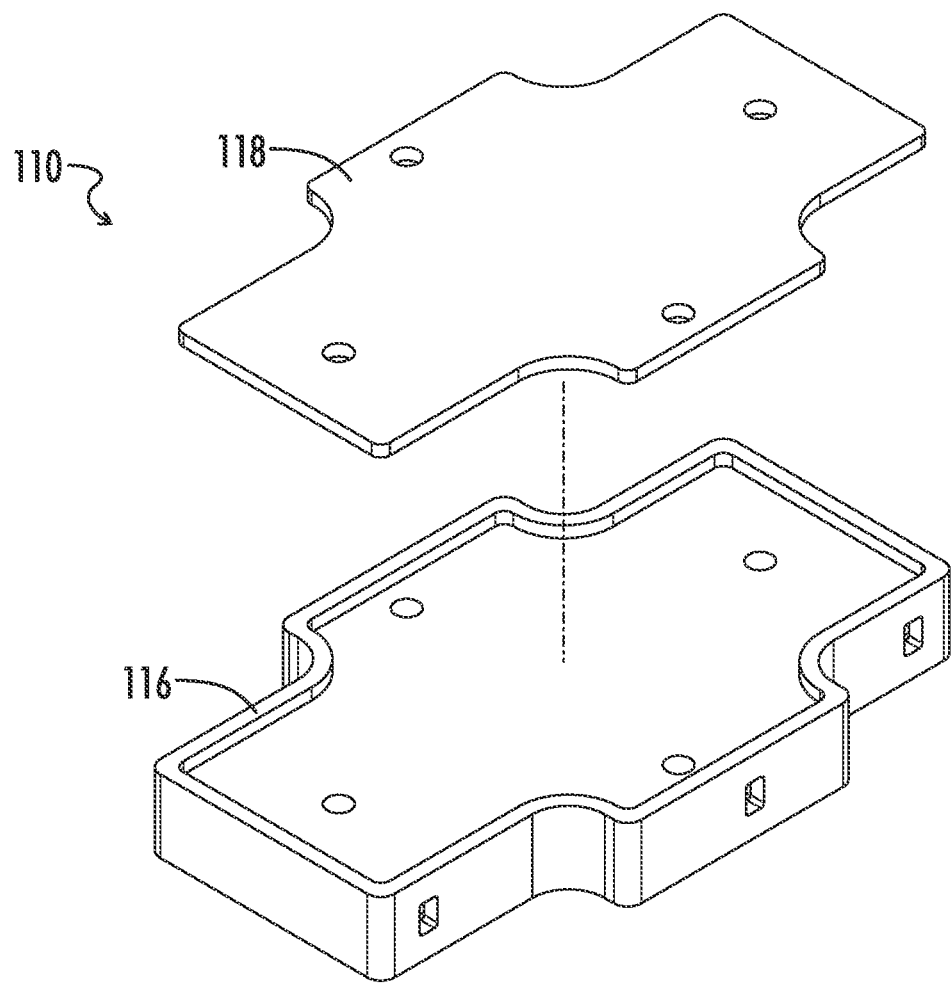
FIG. 6 is a top perspective view of the base plug of FIG. 4 with its recessed plate partially removed.

In FIG. 6, base plug 110 is shown with its two portions: a base plate 116 and recessed plate 118. Base plate 116 provides the main shape and depth of base plug 110 and is slightly longer and wider than recessed plate 118. Further, base plate 116 is stepped at its borders to accommodate recessed plate 118, such that recessed plate 118, when inserted, sits flush with the stepped borders of base plate 116. Recessed plate 118 is formed from 3/16 inch stainless steel, or another metal material, to provide additional strength for supporting an attached radar system 114. However, other thicknesses of recessed plate 118 are compatible with the present disclosure such that recessed plate 118 fits within the stepped boundaries of base plate 116.

Figure 7:
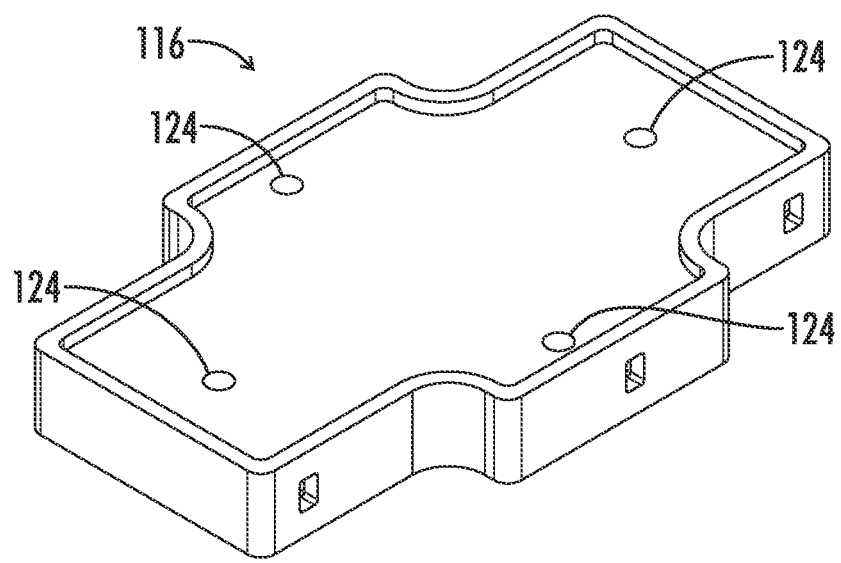
FIG. 7 is a top perspective view of the base plug of FIG. 4 with its recessed plate completely removed.

In FIG. 7, base plate 116 is shown without recessed plate 118 inserted. Base fastener holes 124 are visible, as then span both recessed plate 118 and base plate 116 such that base fasteners 122 are capable of securing base plug 110 to watercraft 120, as well as recessed plate 118 to base plate 116.

Figure 8:
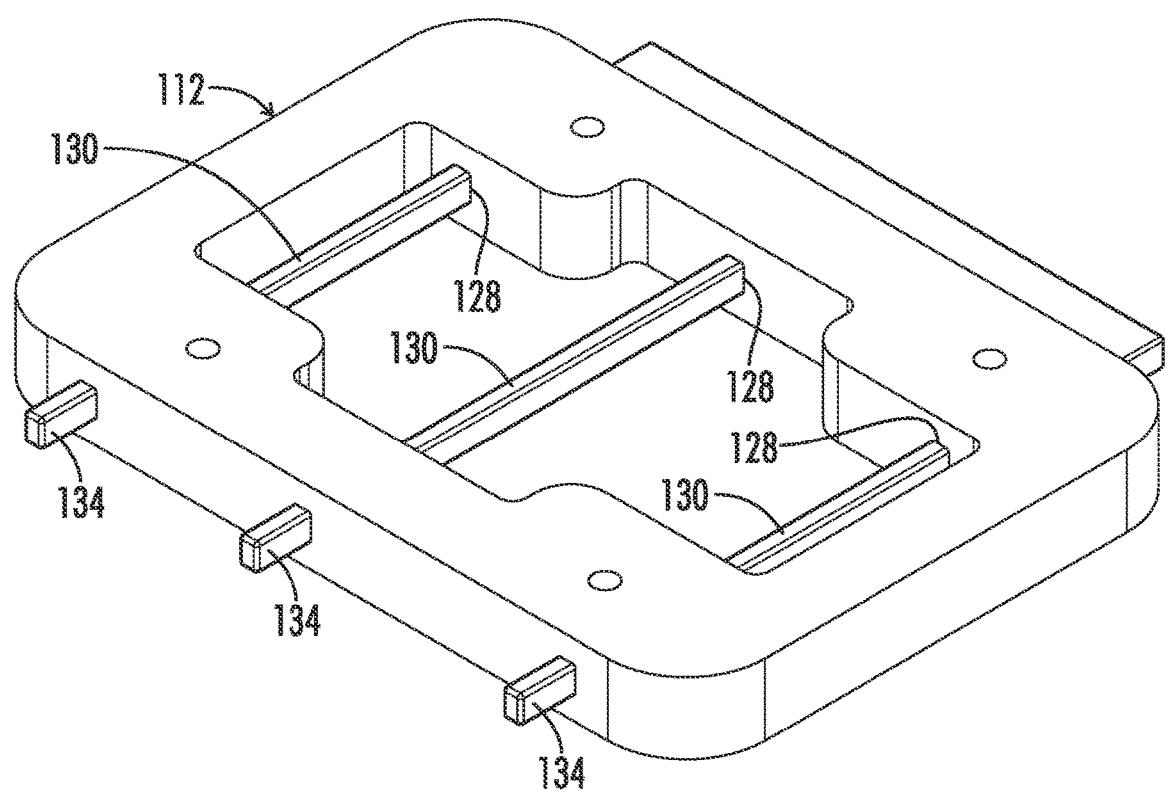
FIG. 8 is a top view of the exterior plate of the radar mount system of FIG. 2 with horizontal rods shown for attachment to the base plug.

In FIG. 8, exterior plate 112 is shown separated from base plug 110. Exterior plate 112 is shaped as a rounded rectangle with a cross-shaped cutout, though other shapes are possible such that base plug 110 fits within the cutout region and radar system 114 is mountable. Exterior plate 112 is sized such that a bolt pattern for the intended commercial radar system 114 is capable of being placed on the top surface of exterior plate 112. Radar fasteners 126 are configured to be inserted into the upper surface of exterior plate 112 according to the bolt pattern compatible with the desired radar system 114. Radar fastener hole positions vary in embodiments not depicted. The dimensions of radar fastener holes are such that they are configured to accommodate radar fasteners 126, which include bolts, screws, or other fastening means known in the art. Radar fasteners 126 are commercially available, and are in some instances included in a kit for the assembly of radar mount system 100.

Exterior plate 112 further includes a plurality of rod holes 128, each for the passage of one horizontal rod 130. In the depicted embodiment, three rod holes 128 with three horizontal rods 130 are present, though other numbers of rod holes 128 and horizontal rods 130 are compatible with the present disclosure such that horizontal rods 130 are configured to removably secure exterior plate 112 about base plug 110. Rod holes 128 within exterior plate 112 are positioned such that they align with rod holes 128 within base plug 110 when base plug 110 is inserted within exterior plate 112, such that, when base plug 110 is inserted within the cutout region of exterior plate 112, horizontal rods 130 are configured to pass through rod holes 128 of each of exterior plate 112 and base plug 110. The presence of horizontal rods 130 within radar mount system 100 positions base plug 110 within exterior plate 112. Further, when horizontal rods 130 are secured, as described below, base plug 110 is configured to be secured within exterior plate 112.

Horizontal rods 130 are 3/8" diameter rods in some embodiments, though other sizes are possible such that horizontal rods 130 fit within rod holes 128 and are compatible with a bracket 132 and locking nuts 134, as described below. Horizontal rods 130 are made of metal, such as stainless steel, though other metals, plastics, or alloys are possible. Horizontal rods 130 are threaded on at least one end for reception of locking nuts 134.

Figure 9:
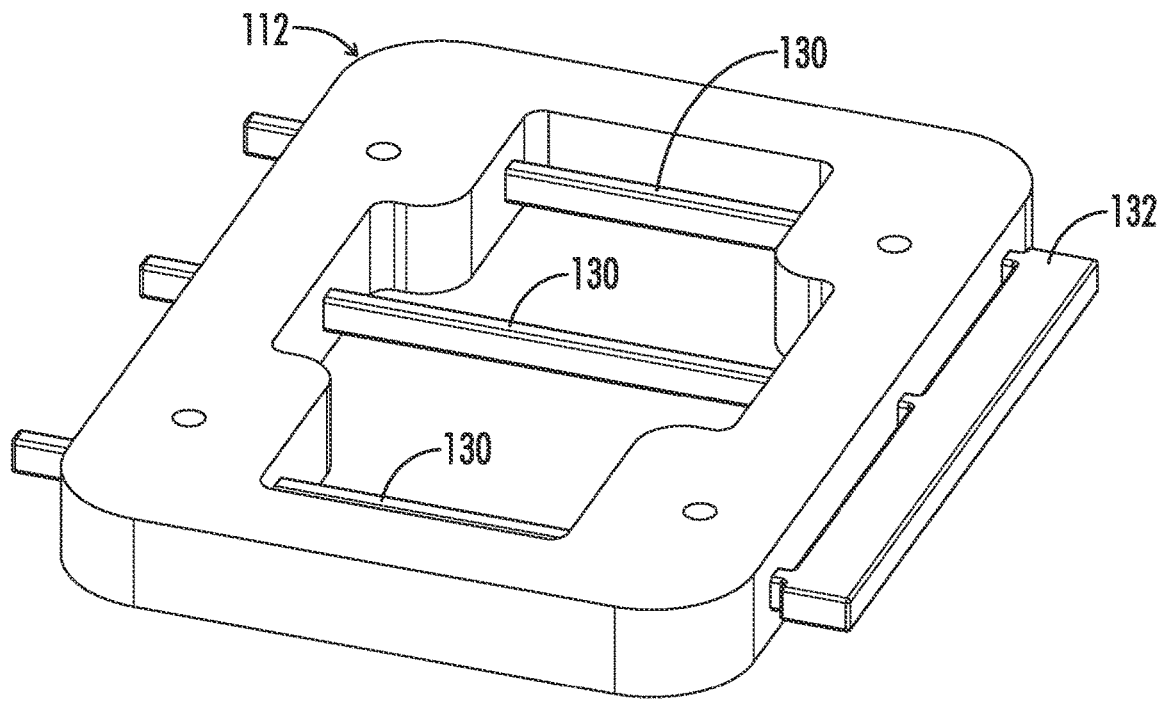
FIG. 9 is a top view of the exterior plate of the radar mount system of FIG. 2 with a bracket holding one end of the horizontal rods in a fixed position.

In FIG. 9, exterior plate 112 is shown with bracket 132 in place to hold horizontal rods 130 in position. While bracket 132 is shown on a left side of exterior plate 112, other embodiments are possible where bracket 132 is positioned on a right side, top, or bottom of exterior plate 112. When base plug 110 is inserted within exterior plate 112, bracket 132 secures one side of each of horizontal rods 130, while one locking nut 134 is configured to be threaded onto the opposite side of each of horizontal rods 130, locking base plug 110 within exterior plate 112. In such a configuration, base plug 110 may be securely mounted and sealed on a hardtop of watercraft 120 and exterior plate 112 may be coupled to base plug 110 along with an attached radar system 114. In this mounted configuration, radar system 114 is mounted to watercraft 120 and in position for operation. When a user wishes to remove radar system 114 from watercraft 120, the user utilizes a security tool uniquely compatible with locking nuts 134 to remove each locking nut 134 from its horizontal rod 130. When locking nuts 134 are removed, each horizontal rod 130 is configured to slide from its rod hole 128, thus unlocking exterior plate 112 from base plug 110. When exterior plate 112 is not locked into position by locking nuts 134 and horizontal rods 130, it is configured to be lifted from about the mounted base plug 110, along with radar system 114. Therefore, radar system 114 and exterior plate 112 are removable from base plug 110 without altering or damaging the waterproof seal of base plug 110. Radar system 114 and exterior plate 112 are configured to be reinstalled about base plug 110 by first placing exterior plate 112 about base plug 110, reinserting horizontal rods 130 through rod holes 128, and then re-securing horizontal rods 130 with locking nuts 134 using the specialized security tool.

In some instances, radar mount system 100 is available as a kit. Such a kit contains base plug 110 and exterior plate 112 with all holes pre-drilled. Specifically, radar fastener holes are pre-drilled in the positions and dimensions required by the intended radar system 114. The kits may further include one or more of radar fasteners 126, base fasteners 122, horizontal rods 130, locking nuts 134, bracket 130, the security tool, and thread locking adhesive.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

We claim:

1. A radar mount system comprising:
   a base plug for attachment upon a surface of a watercraft, the base plug having at least one base fastener hole, each base fastener hole configured to accommodate one base fastener for attaching the base plug to the watercraft;
   an exterior plate having at least one radar fastener hole and a center cutout, each radar fastener hole configured to accommodate one radar fastener for attaching a radar system to the exterior plate, and the center cutout configured to receive the base plug for connecting the exterior plate to the base plug; and
   a locking system having at least one horizontal rod, a bracket, and at least one locking nut, each horizontal rod configured to be inserted through at a set of aligned rod holes in each of the base plug and the exterior plate, each horizontal rod threaded on a first end to receive one locking nut, and each horizontal rod configured to connect to the bracket at a second end,
   such that, when the base plug is mounted on the watercraft and the exterior plate is positioned with the base plug in its center cutout, the at least one horizontal rod is configured to be inserted through the set of aligned rod holes with the bracket on the second end and the at least one locking nut on the first end, securing the exterior plate with the attached radar system about the base plug on the watercraft,
   and such that, when each locking nut is removed from each horizontal rod, the locking system is configured to be removed from the base plug and exterior plate, allowing the exterior plate with the attached radar system to be removed from the base plug without removing the base plug from the watercraft.

2. The radar mount system of claim 1, wherein the at least one locking nut is removable using a security tool that is uniquely compatible with a shape of the at least one locking nut.

3. The radar mount system of claim 1, wherein the base plug is configured to be sealed to the watercraft using a waterproof sealant between the base plug and the watercraft.

4. The radar mount system of claim 3, wherein a waterproof seal between the base plug and the watercraft is maintained when the exterior plate with the attached radar system is removed from the base plug.

5. The radar mount system of claim 1, wherein the base plug includes a recessed plate for providing support for the radar system.

6. The radar mount system of claim 1, wherein the exterior plate and the base plate are composed of marine-grade high-density polyethylene (HDPE) material.

7. The radar mount system of claim 1, wherein the set of aligned rod holes are positioned on parallel sides of each of the base plug and the exterior plate.

8. A radar mount kit comprising:
   a base plug for attachment upon a surface of a watercraft, the base plug having at least one base fastener hole;
   at least one base fastener configured to be received within one base fastener hole for attaching the base plug to the watercraft;
   an exterior plate having at least one radar fastener hole and a center cutout, the center cutout configured to receive the base plug for connecting the exterior plate to the base plug;
   at least one radar fastener configured to be received within one radar fastener hole for attaching a radar system to the exterior plate; and
   a locking system having at least one horizontal rod, a bracket, and at least one locking nut, each horizontal rod configured to be inserted through at a set of aligned rod holes in each of the base plug and the exterior plate, each horizontal rod threaded on a first end to receive one locking nut, and each horizontal rod configured to connect to the bracket at a second end,
   such that, when the base plug is mounted on the watercraft and the exterior plate is positioned with the base plug in its center cutout, the at least one horizontal rod is configured to be inserted through the set of aligned rod holes with the bracket on the second end and the at least one locking nut on the first end, securing the exterior plate with the attached radar system about the base plug on the watercraft,
   and such that, when each locking nut is removed from each horizontal rod, the locking system is configured to be removed from the base plug and exterior plate, allowing the exterior plate with the attached radar system to be removed from the base plug without removing the base plug from the watercraft.

9. The kit of claim 8, further comprising a security tool that is uniquely compatible with a shape of the at least one locking nut for attaching and removing the at least one locking nut from the at least one horizontal rod.

10. The kit of claim 8, further comprising a waterproof sealant for creating a waterproof seal between the base plug and the watercraft between the base plug and the watercraft.

11. The kit of claim 8, wherein the base plug includes a recessed plate for providing support for the radar system.

12. The kit of claim 8, wherein the exterior plate and the base plate are composed of marine-grade high-density polyethylene (HDPE) material.

13. The kit of claim 8, further including a thread locking adhesive for securing the at least one radar fastener within the at least one radar fastener hole.

14. The kit of claim 8, wherein the at least one radar fastener hole is positioned about the exterior plate in a pattern that is compatible with attachment of the radar system.

15. A method of removing a mounted radar system from a watercraft without compromising a waterproof seal between a radar mount system and the watercraft, the method comprising the steps of:
  providing a watercraft with a radar mount system for radar system attachment, the radar mount system including:
    a base plug attached upon a surface of the watercraft, the base plug having at least one base fastener hole, each base fastener hole accommodating one base fastener to attach the base plug to the watercraft;
    an exterior plate having at least one radar fastener hole and a center cutout, each radar fastener hole accommodating one radar fastener to attach the radar system to the exterior plate, and the center cutout receiving the base plug to connect the exterior plate to the base plug; and
    a locking system having at least one horizontal rod, a bracket, and at least one locking nut, each horizontal rod inserted through at a set of aligned rod holes in each of the base plug and the exterior plate, each horizontal rod threaded on a first end and receiving one locking nut, and each horizontal rod connected to the bracket at a second end, such that the exterior plate with the attached radar system is secured about the base plug on the watercraft;
  removing each of the at least one locking nuts from each of the at least one horizontal rods;
  removing the locking system from the base plug and exterior plate; and
  removing the exterior plate with the attached radar system from the base plug without removing the base plug from the watercraft, such that a waterproof seal between the base plug and the watercraft is maintained.

16. The method of claim 15, wherein each of the at least one locking nuts are removed using a security tool that is uniquely compatible with a shape of the at least one locking nut.

17. The method of claim 15, wherein the exterior plate and the base plate are composed of marine-grade high-density polyethylene (HDPE) material.

18. The radar mount system of claim 1, wherein locking system includes three horizontal rods.

19. The kit of claim 8, wherein locking system includes three horizontal rods.

20. The method of claim 15, wherein locking system includes three horizontal rods.

* * * * *